United States Patent [19]

Evans

[11] Patent Number: 5,152,264
[45] Date of Patent: Oct. 6, 1992

[54] INTERNAL COMBUSTION ENGINE OIL PUMP WITH COVER

[75] Inventor: Paul G. Evans, Great Alne, Great Britain

[73] Assignee: Concentric Pumps Limited, Great Britain

[21] Appl. No.: 697,800

[22] Filed: May 9, 1991

[30] Foreign Application Priority Data

May 12, 1990 [GB] United Kingdom ................. 9010685

[51] Int. Cl.⁵ ............................................. F01M 11/02
[52] U.S. Cl. ............................. 123/196 R; 123/198 C; 123/195 C
[58] Field of Search ........... 123/196 R, 198 C, 192 B, 123/195 C

[56] References Cited

U.S. PATENT DOCUMENTS

| 4,156,409 | 5/1979 | Nakano | 123/192 B |
| 4,373,483 | 2/1983 | Bury | 123/198 C |
| 4,440,123 | 4/1984 | Tsai | 123/192 B |
| 4,545,341 | 10/1985 | Corey et al. | 123/192 B |
| 4,793,301 | 12/1988 | Ishikawa | 123/192 B |
| 4,827,881 | 5/1989 | Baker et al. | 123/198 C |

Primary Examiner—E. Rollins Cross
Assistant Examiner—Erick Solis
Attorney, Agent, or Firm—Learman & McCulloch

[57] ABSTRACT

Figure 1:
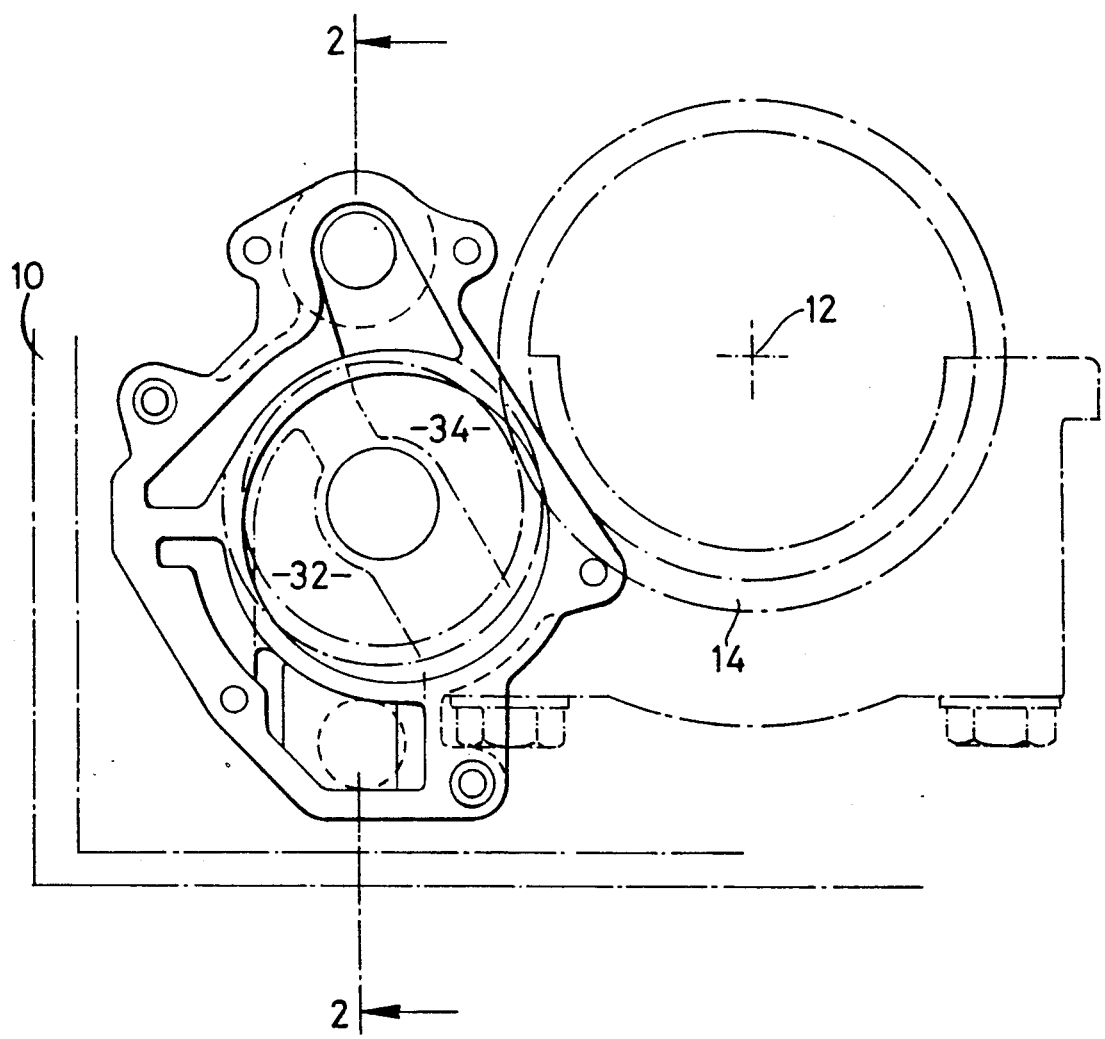

An I.C. engine lubrication system comprises a gerotor pump set driven by a gear meshed with another gear on the crankshaft (FIG. 1). This enables pump diameter to be selected for minimum power absorption as compared with prior art arrangements where the gerotor surrounds the crankshaft, and also simplifies pipework particularly on the delivery side of the pump.

2 Claims, 2 Drawing Sheets

# INTERNAL COMBUSTION ENGINE OIL PUMP WITH COVER

This invention relates to I.C. engines particularly for motor vehicles.

Contemporary design practice provides a cylinder block with a front face through which the crank shaft projects. The main lubrication system is usually in the form of a gear pump or a gerotor pump substantially surrounding the crank shaft nose. That is to say a first annular component surrounds the crank shaft, and that in turn is meshed with the second component of the pump. If a gerotor set is used the first component is the male rotor with n lobes and the second component is a surrounding annulus with n+1 internal lobes. The gerotor set sits in a pump cavity provided in the front face of the block and closed by a cover plate. Lubricating oil is drawn for example from the sump below the cylinder block and is fed from the pump via a pipe to a position upwardly and laterally of the crankshaft to connect to the main oil gallery which usually extends along the block.

Such arrangements have several disadvantages, in particular the pump size is dictated by crankshaft size which leads to substantial power losses, and the pump location demands complex pipes to deliver oil to and from the pump.

A number of published but possibly unused proposals attempted to solve these problems: in particular GB 2130653A bolts the pump body to the engine block and drives the pump from the crank shaft by a transmission belt. However this introduces a new source of inefficiency in transmission losses.

The object of the invention is to provide improvements.

According to the invention an I.C. engine has a cylinder block with a front face, a shallow dished cover is secured to the front face, an oil pump set is provided in said cover at a position above the crankshaft and near or aligned with the oil gallery, the pump set is driven from the crank shaft via a gear pinion provided on or by the crank shaft nose, and the output of the pump is fed to the oil gallery internally of the cover.

The arrangement according to the invention has the first advantage that because the pump set does not surround the crank shaft it can be made of a diameter bearing no relation to the crank diameter. When, as in the state of the art designs the crank extends through the pump a large diameter pump results. A large diameter pump absorbs a substantial amount of the power output of the engine. The invention allows a small diameter pump to be used and this reduces the power requirement and incidentally also significantly reduces noise output.

A second advantage from the invention is that the use of internal oil ways in the cover provides a neater more reliable and less vulnerable construction than the previous external oil pipes.

A most important advantage is that the pump outlet can register directly with the gallery. This not only simplifies the flow path but avoids pressure loss, and again this contributes to minimising power requirements.

Preferably the oil pump is a gerotor set and the male lobed rotor of the set (having n lobes) is located in the female internally lobed (n+1 lobes) annulus which is rotatable in a cylindrical cavity in the cover, with inlet and outlet ports and supply passages connected thereto provided in the cover.

The gerotor set may be journalled on a shaft pressed into a socket in the cover as force-fit, and the rotor may be integral or fast with a closure plate for the said cavity and which is provided with gear teeth on its periphery to mesh with the crank pinion or be driven from the crank pinion via an intermediate pinion or gear train. The invention also enables a simple sump design to be employed as compared to other state of the art arrangements where the pump is driven from the crank shaft but is located below the same in the sump so as to draw oil from the sump and direct it via a complex pipework to the gallery.

The invention enables the cylinder block to have a flush front face at right angles to a flush lower face, both of which can be machined flat, the dished cover fitting directly to the front face, and the sump extending across the lower face and across the lower edge of the cover, with appropriate usual gaskets between the parts.

Figure 2:
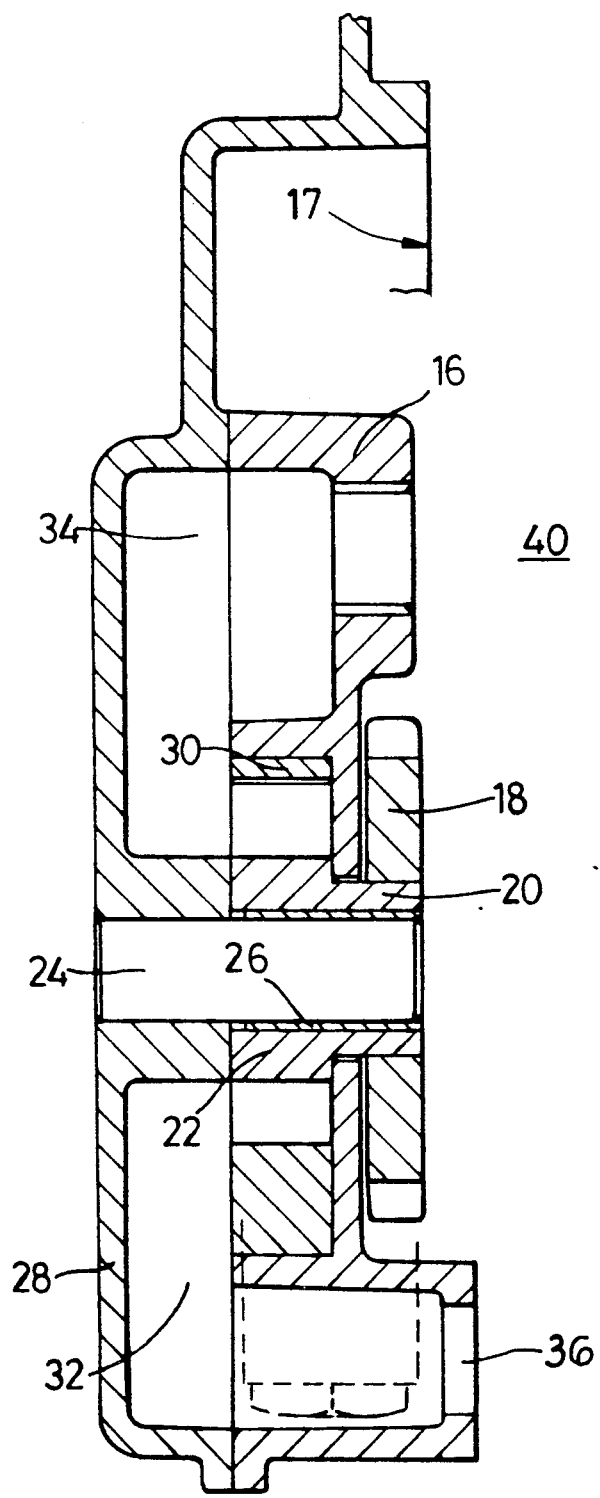

One presently preferred embodiment is now more particularly described with reference to the accompanying drawings wherein:

FIG. 1 is a somewhat diagrammatic elevation, and
FIG. 2 is a section on the line 2,2 of FIG. 1.

In the drawing, the crank shaft centre line position is indicated by the reference 12 in the crank case or sump 10. A gear 14 is carried by the nose of the crank shaft. An inner gear-case 16 (FIG. 2) is bolted to a front face 17 at the front end of the engine block/crank case, and gear pinion 18 is located between that gear-case and the block to mesh with the crankshaft gear 14. The crankshaft is supported between the cylinder block and the sump 10 for rotation about an axis substantially normal to the front face 17 of the cylinder block in the usual manner. The pinion 18 is fast, preferably as an interference fit, with the nose 20 on a male gerotor component 22 which is carried on shaft 24 with an interposed bush 26. Shaft 24 is mounted fast in cover 28. The cover 28 comprises inner and outer parts and upper and lower ends secured to the front face 17, as shown in FIG. 2.

The male gerotor part 22 is meshed in a female gerotor part 30 journalled in a chamber in the inner gear-case component 16. The working chambers formed between the rotor and annulus open to an inlet cavity 32 in the outer case 28 and to an outer cavity 34 in the same. The inlet cavity 32 open through a series of passages to an inlet 36 which is in the sump and can draw directly from the sump and the outlet cavity 34 can deliver direct to the adjacent end of main oil gallery 40.

It will be seen that this provides a particularly simple oil flow system and drive system which avoids the inefficiencies of the prior art.

In an alternative possibility, not shown, the male lobed rotor 22 is freely journalled on shaft 24 with or without bush 26, and one axial portion of the annulus 30 is exposed from the cavity and provided with gear teeth to mesh with a drive pinion and transmit drive to the pump.

I claim:
1. An internal combustion engine comprising a cylinder block having a front face; a lubrication sump positioned below said cylinder block; a crankshaft supported between said cylinder block and said sump for rotation about an axis substantially normal to said front face of said cylinder block; a shallow dished cover comprising inner and outer parts and upper and lower ends secured to said front face; a journal shaft fast with said cover and extending toward said cylinder block parallel to said axis; a cylindrical recess in said cover eccentric of said journal shaft; a gerotor lubrication pump having an internally toothed annulus journaled in said recess and in mesh with a male toothed rotor having fewer teeth than said annulus within said annulus and journaled on said journal shaft; a drive pinion within said cover and fast with said rotor; a gear pinion fixed to said crankshaft and in mesh with said drive pinion, said lower end of said cover being formed with an inlet connection between said sump and said gerotor pump; a main oil delivery gallery extending along said cylinder block for connection to lubrication points; and an outlet from said gerotor pump opening from said upper end of said cover and aligned directly with said gallery.

2. An internal combustion engine comprising a cylinder block having a front face; a lubrication sump positioned below said cylinder block; a crankshaft supported between said cylinder block and said sump for rotation about an axis substantially normal to said front face of said cylinder block; an inner gear case secured to said front face of said cylinder block and having a lubrication inlet communicating with said sump and a spaced lubrication outlet communicating with a main lubrication gallery of said engine; a cover overlying said inner gear case; a journal shaft fast with said cover and extending rearwardly through said inner gear case parallel to said axis; a cylindrical recess in said inner gear case eccentric of said journal shaft; a gerotor lubrication pump between said inlet and said outlet of said inner gear case and having an internally toothed annulus journaled in said recess and in mesh with a male toothed rotor having fewer teeth than said annulus within said annulus and journaled on said journal shaft; and a drive pinion fast with said rotor; a gear pinion fixed to said crankshaft and in mesh with said drive pinion, said cover having an inlet cavity for transferring lubricant from said inlet of said inner gear case to said gerotor pump and an outlet cavity for transferring lubricant from said gerotor pump to said outlet of said inner gear case.

* * * * *